US009683345B2

(12) United States Patent
Joiner et al.

(10) Patent No.: US 9,683,345 B2
(45) Date of Patent: Jun. 20, 2017

(54) CONTAINMENT BOOM AND METHOD OF DEPLOYMENT

(71) Applicant: SMARTVISTA, LLC, Duncan, SC (US)

(72) Inventors: Marvin Patrick Joiner, Spartanburg, SC (US); Paul Helmer Lehner, Spartanburg, SC (US)

(73) Assignee: SmartVista, LLC, Duncan, SC (US)

( * ) Notice: Subject to any disclaimer, the term of this patent is extended or adjusted under 35 U.S.C. 154(b) by 0 days.

(21) Appl. No.: 15/337,069

(22) Filed: Oct. 28, 2016

(65) Prior Publication Data

US 2017/0130414 A1    May 11, 2017

Related U.S. Application Data

(60) Provisional application No. 62/251,854, filed on Nov. 6, 2015.

(51) Int. Cl.
  *E02B 15/00*     (2006.01)
  *E02B 15/06*     (2006.01)
  (Continued)

(52) U.S. Cl.
  CPC ......... *E02B 15/06* (2013.01); *B65H 75/4426* (2013.01); *B01D 17/0202* (2013.01);
  (Continued)

(58) Field of Classification Search
  CPC .......... E02B 15/00; E02B 15/08; E02B 1/003; E02B 15/06; E02B 15/0814;
  (Continued)

(56) References Cited

U.S. PATENT DOCUMENTS 2,200,552 A   5/1940  Hook
3,539,013 A  11/1970  Smith
            (Continued)

FOREIGN PATENT DOCUMENTS

WO    92/09750 A1   6/1992
WO     9707291 A1   2/1997

OTHER PUBLICATIONS

International Search Report dated Jan. 25, 2017.
Written Opinion of the International Searching Authority dated Jan. 25, 2017.

*Primary Examiner* — Benjamin Fiorello
*Assistant Examiner* — Edwin Toledo-Duran
(74) *Attorney, Agent, or Firm* — Timothy J. Monahan; Monahan & Company, LLC

(57) ABSTRACT

A method of deploying a containment boom is provided whereby an elongated material, such as a sheet, yarn, or yarn bundle, is formed into a roll and the material is pulled from the interior of the roll to create a helical structure. A pull rope is threaded through the interior of the roll and is deployed along with the material, such that the material is wrapped around the pull rope. The pull rope prevents the boom from stretching and distorting the helical structure formed by the material, as well as preventing the material from self-wringing. Multiple rolls of material may be provided in a single boom package arranged in coaxial alignment. When the materials are connected in parallel, they are integrated into a single boom having concentrically wrapped materials, thereby providing for greater stability and functionality.

26 Claims, 10 Drawing Sheets

(51) Int. Cl.
  *B65H 75/44* (2006.01)
  *B01D 17/02* (2006.01)
  *C02F 1/28* (2006.01)
  *C02F 101/32* (2006.01)
  *C02F 103/00* (2006.01)
  *C02F 103/08* (2006.01)

(52) U.S. Cl.
  CPC ............ *C02F 1/28* (2013.01); *C02F 2101/32* (2013.01); *C02F 2103/007* (2013.01); *C02F 2103/08* (2013.01); *C02F 2201/008* (2013.01)

(58) Field of Classification Search
  CPC ............ E02B 15/0835; E02B 15/0842; E02B 15/0871; E02B 15/0864; E02B 15/085; E02B 15/0807
  USPC ............ 405/60–70, 212–215; 114/219–220
  See application file for complete search history.

(56) References Cited

U.S. PATENT DOCUMENTS

| | | | |
|---|---|---|---|
| 3,563,036 A | 2/1971 | Smith et al. | |
| 3,679,058 A * | 7/1972 | Smith | C02F 1/681 |
| | | | 210/242.4 |
| 3,731,491 A | 5/1973 | Markel et al. | |
| 4,123,911 A * | 11/1978 | Finigan | E02B 15/08 |
| | | | 210/923 |
| 4,295,755 A | 10/1981 | Meyers | |
| 4,875,427 A * | 10/1989 | Harris, Jr. | B63B 59/02 |
| | | | 114/219 |
| 5,000,616 A | 3/1991 | Bell et al. | |
| 5,016,554 A * | 5/1991 | Harris, Jr. | E02B 3/26 |
| | | | 114/219 |
| 5,066,164 A | 11/1991 | Tomosy | |
| 5,087,152 A | 2/1992 | Whidden | |
| 5,197,821 A | 3/1993 | Cain et al. | |
| 5,362,180 A * | 11/1994 | Canning | E02B 15/0807 |
| | | | 405/63 |
| 5,451,325 A * | 9/1995 | Herkenberg | B01D 17/0202 |
| | | | 134/42 |
| 5,480,261 A * | 1/1996 | Meyers | E02B 15/08 |
| | | | 405/63 |
| 5,480,262 A | 1/1996 | Russo, III | |
| 5,522,674 A | 6/1996 | Cooper | |
| 6,383,045 B1 * | 5/2002 | Eckardt | B63B 22/18 |
| | | | 440/16 |
| 6,880,290 B2 * | 4/2005 | Mahoney | A01K 69/00 |
| | | | 43/100 |
| 7,090,432 B2 | 8/2006 | Jackson | |
| 7,785,036 B2 | 8/2010 | Pinheiro de Andrade | |
| 7,828,494 B1 * | 11/2010 | Reynolds | E02B 15/06 |
| | | | 405/63 |
| 2003/0005873 A1 * | 1/2003 | Vretta | E02B 3/26 |
| | | | 114/219 |
| 2011/0318109 A1 | 12/2011 | Miller et al. | |
| 2012/0163915 A1 * | 6/2012 | Hill | E02B 15/046 |
| | | | 405/66 |
| 2014/0319039 A1 * | 10/2014 | Hourani | E02B 15/06 |
| | | | 210/170.05 |

* cited by examiner

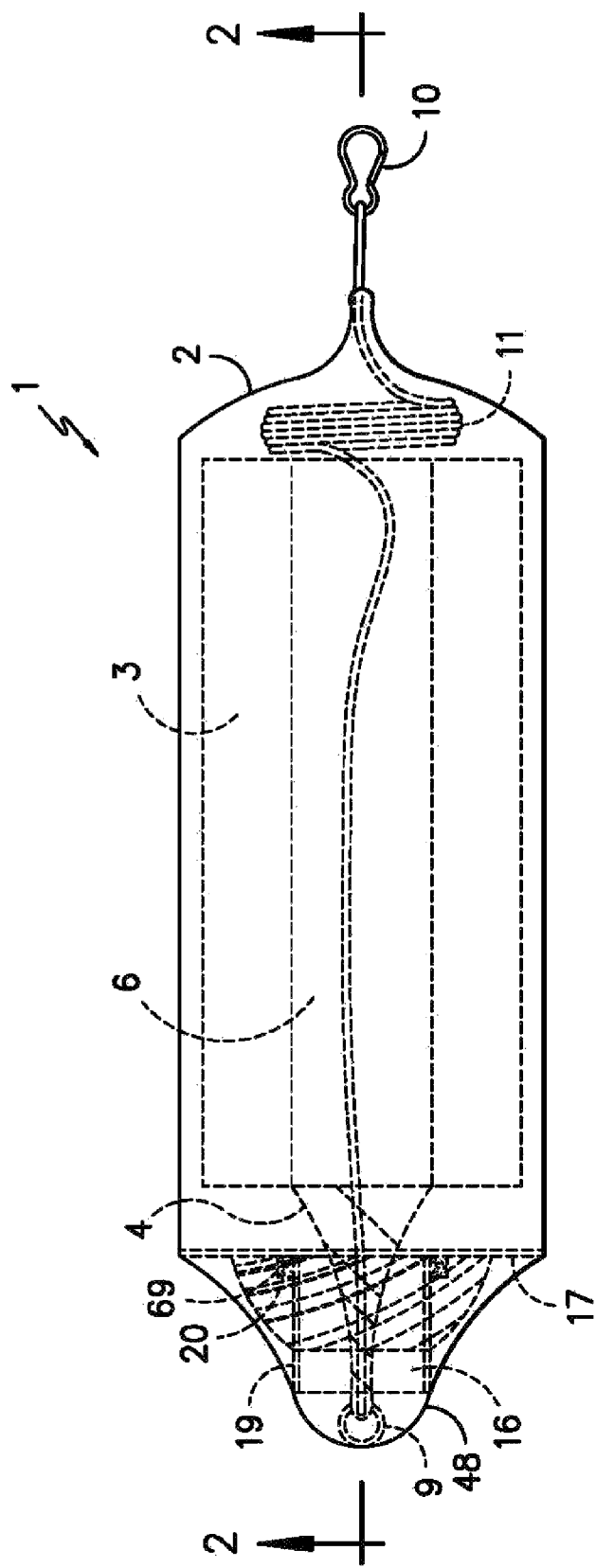

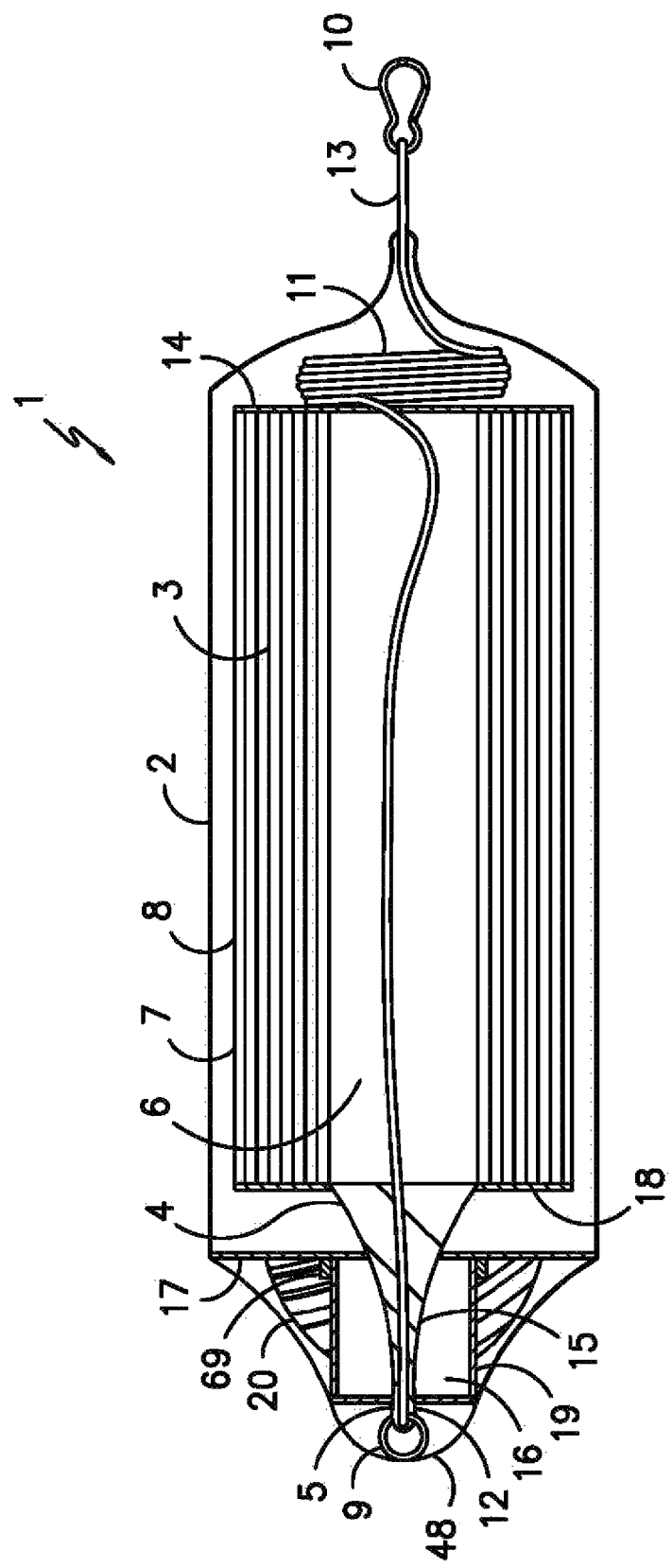
FIG. -2-

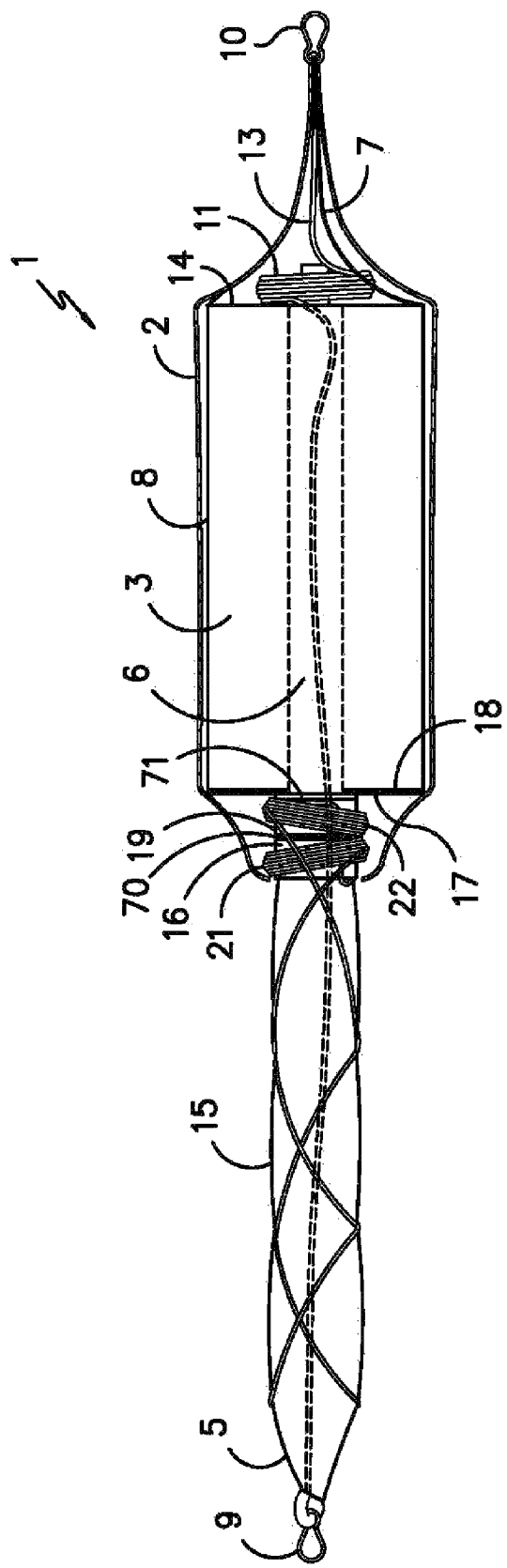
FIG. -3-

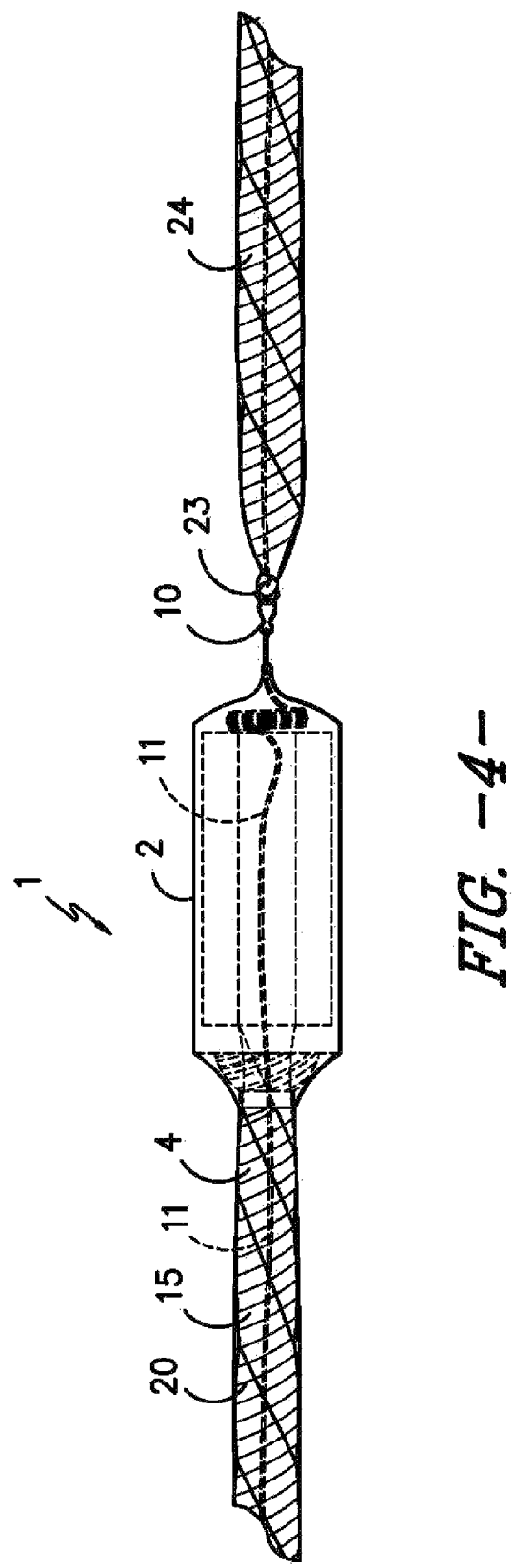
FIG. -4-

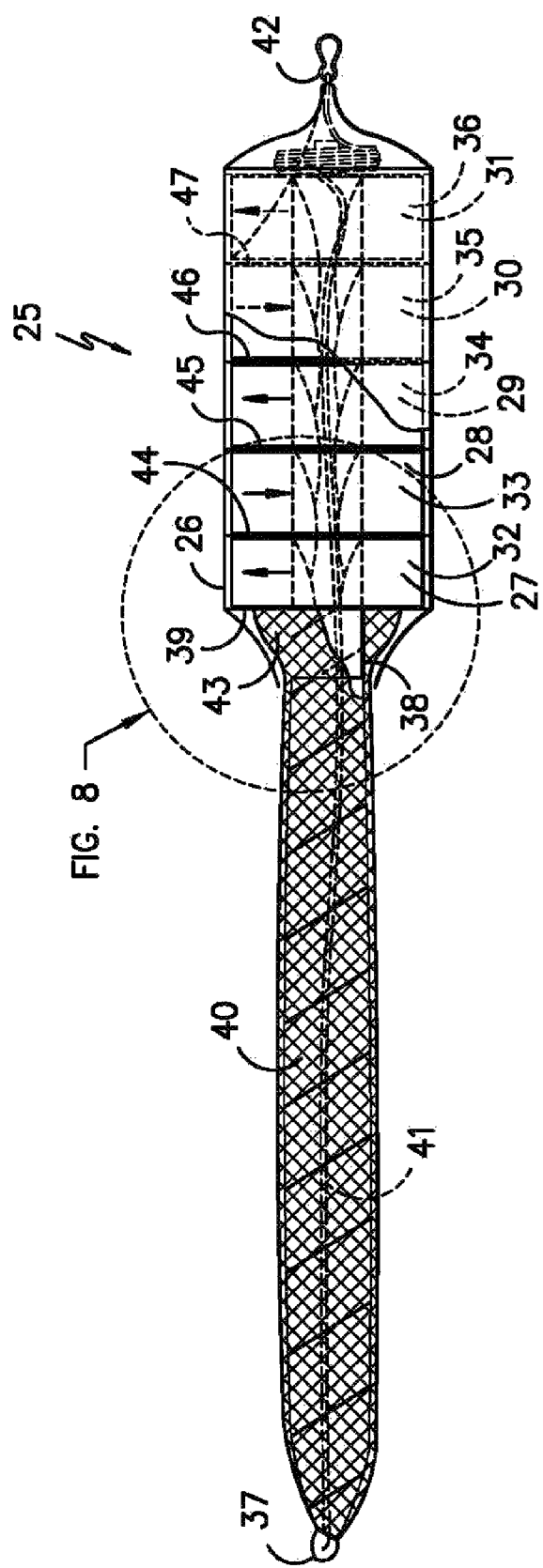
FIG. -5-

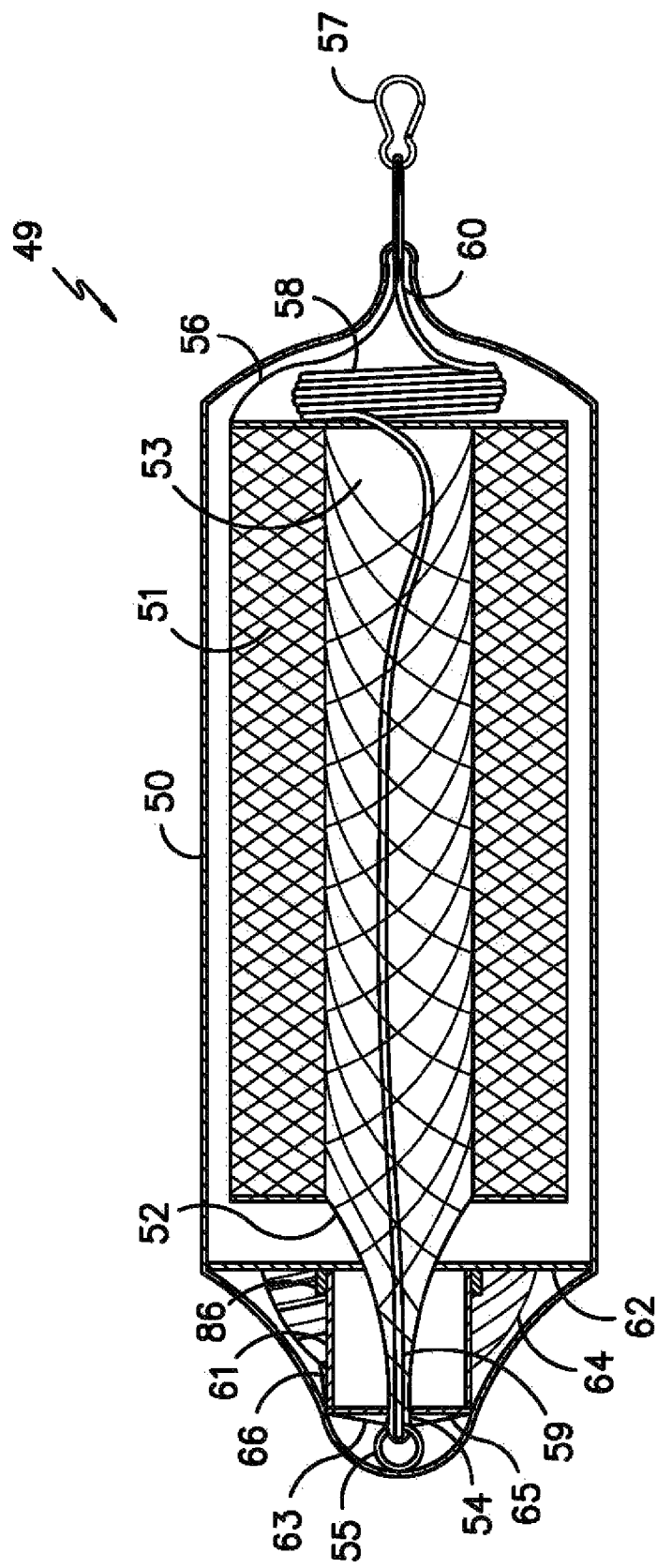
FIG. -6-

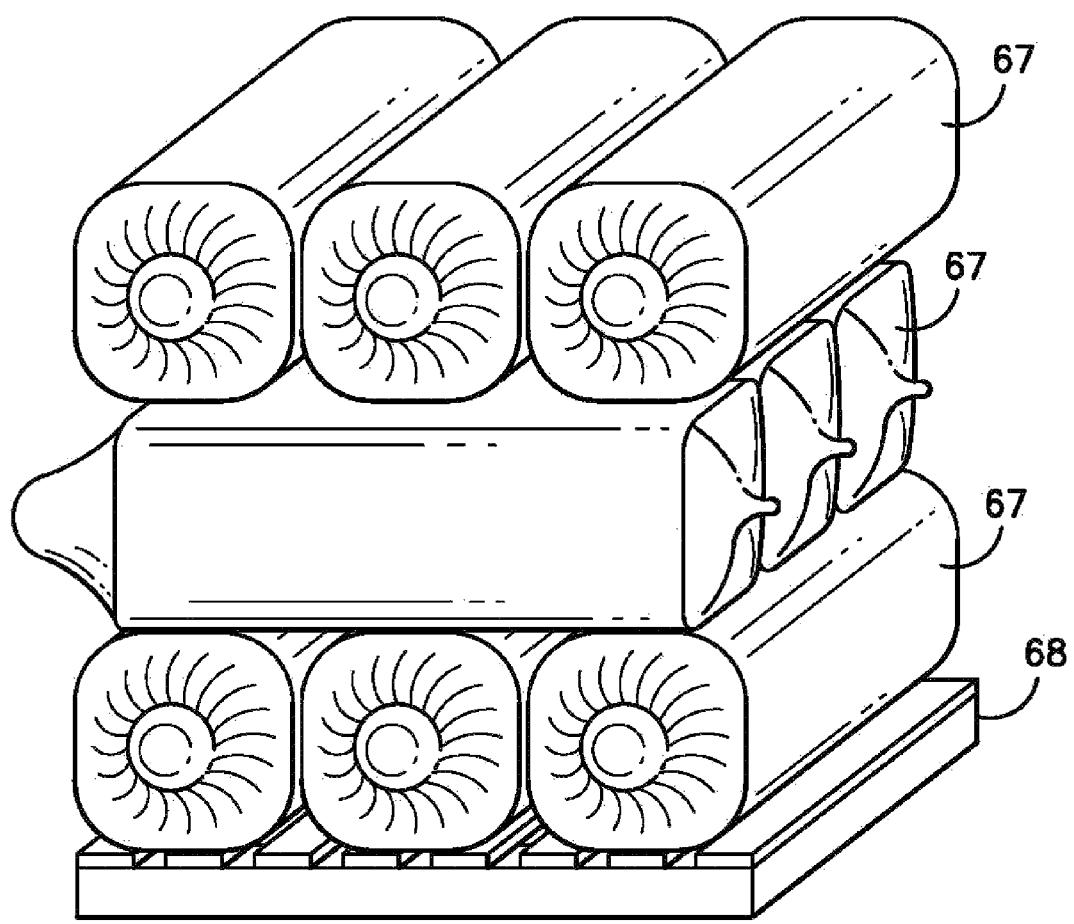
FIG. -7-

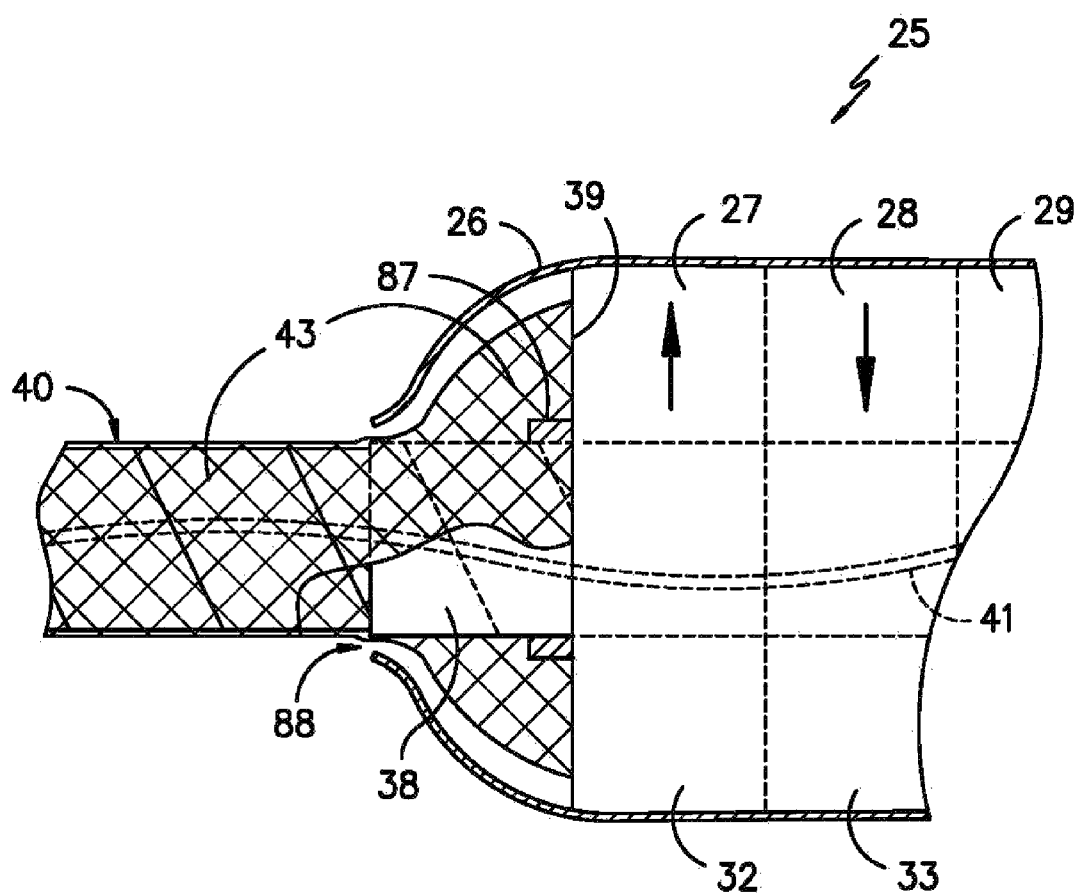
FIG. -8-

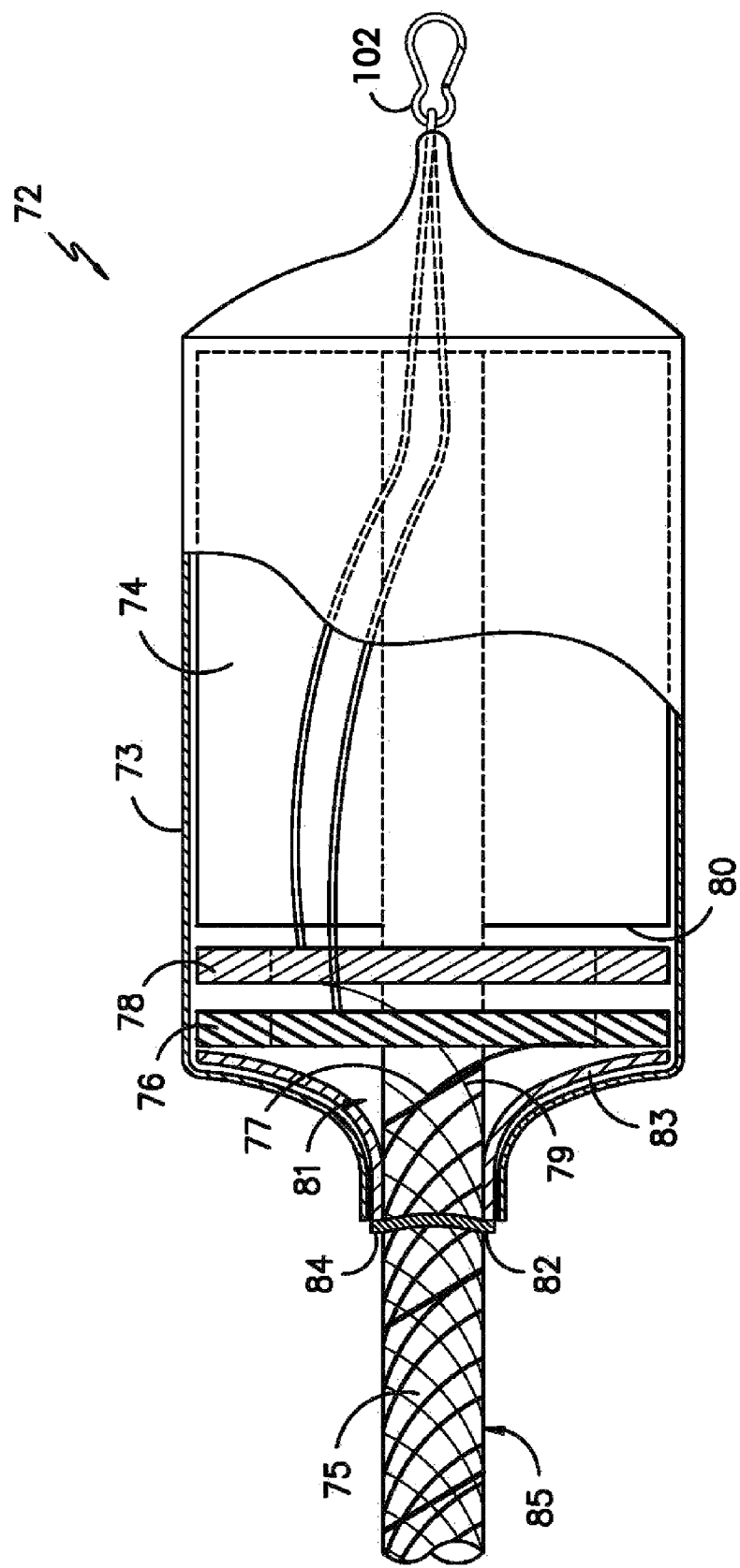

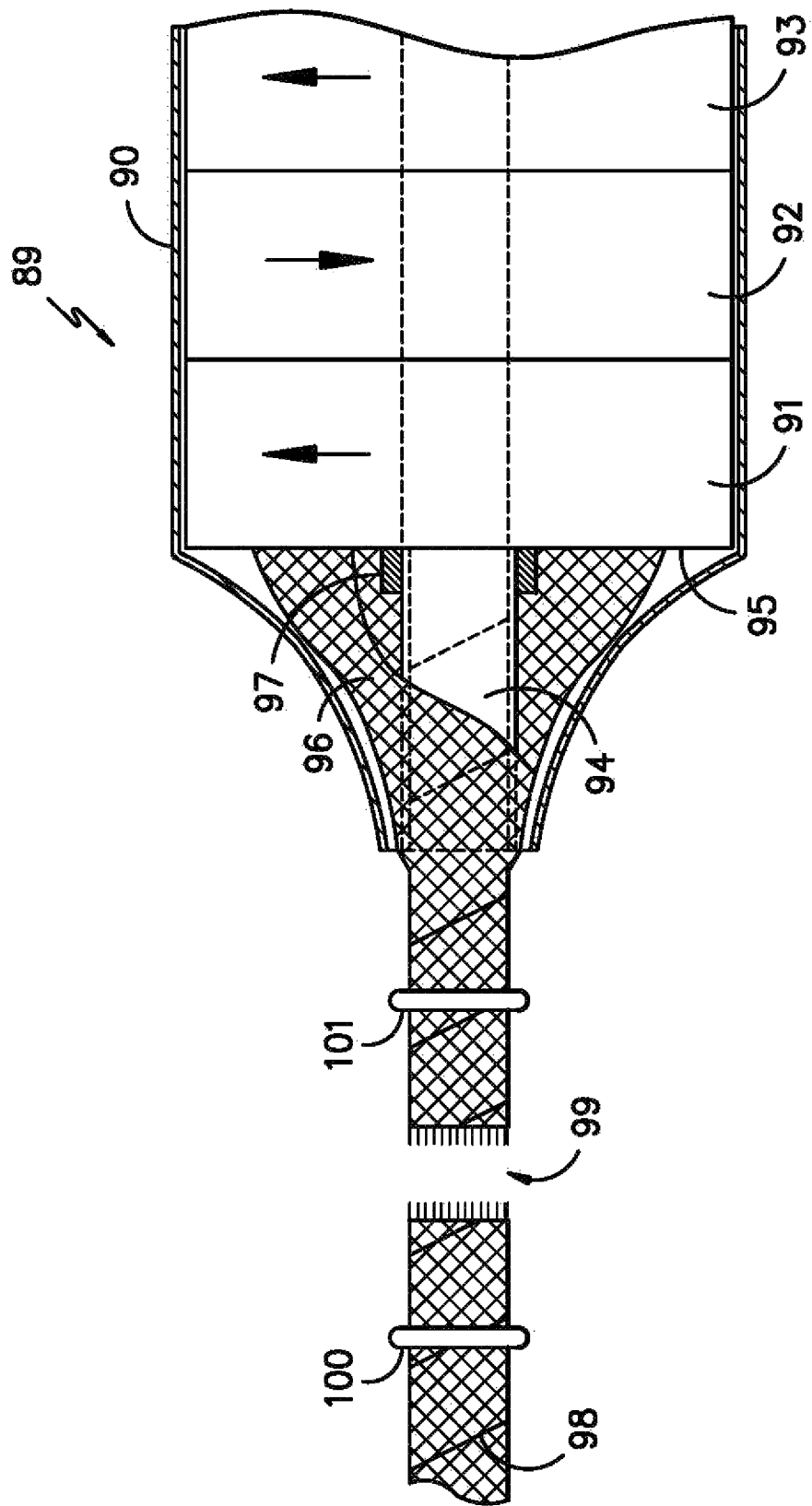

CONTAINMENT BOOM AND METHOD OF DEPLOYMENT

The present invention is directed to a boom for containing a liquid or solid material, such as may be released into the environment by a spill. The boom is provided as an elongated material in the configuration of a roll, and the lead end of the material is drawn from the interior of the roll to form a helical boom.

BACKGROUND OF THE INVENTION

Methods and devices for deploying a film of an oleophilic material on a body of water to contain an oil spill are disclosed in the following references.

Herkenberg—U.S. Pat. No. 5,451,325 discloses deploying non-fibrous, oleophilic films from a dispenser roll. The film is paid out from the outside of the roll and passes through a guide loop. The film forms a helical structure on a body of water.

Reynolds et al.—U.S. Pat. No. 7,828,494 B1 disclose a buoy assembly. The assembly includes a rigid body and mounting assembly for supporting a roll of an oleophilic film, such as polyethylene. The film is paid out from the outside of the roll through an aperture in the body, which is intended to twist the deployed length of film into a helical configuration. Multiple buoys can be arranged side-by-side, with each buoy paying out a length of film, to improve coverage.

Hill—U.S. Patent Application Publication No. 2012/0163915 A1 discloses a dispenser for a polyethylene film for containing oil spills. The dispenser has a rear wall for supporting the roll and a front wall having an aperture. The film is paid out from the outside of the roll through the aperture, thereby forming a helically twisted "rope" of film.

Despite the prior art methods and devices, there remains a need for a method of deploying a boom that can employ a wide variety of types of materials and constructions, that can deploy multiple materials from multiple rolls in parallel, whereby the materials are integrated into a single boom, that can prevent the boom from self-wringing when it is stretched, and that does not require a rigid support structure for the roll of material. The foregoing shortcomings are overcome and numerous other advantages are provided by the present invention.

SUMMARY OF THE INVENTION

The present invention is directed to a method of deploying a containment boom, as well as an apparatus for practicing the method. Additionally, the invention includes the novel boom created by practicing the method.

A flexible, elongated material is provided in roll form having a head end drawn from the interior of the roll and a tail end located on the exterior of the roll. A guide having an orifice aligned perpendicular to the axis defined by the core of the roll is provided. A pulling force is applied to the head end of the material, causing it to unspool from the interior of the roll and to be drawn through the orifice, to form an elongated helical boom structure.

As used herein in conjunction with the material(s), binder and pull rope, the terms "attached" and "connected" mean that the components are joined together either directly or indirectly through appropriate connectors, such as hardware or leaders. The term "adjacent" is intended to provide a relative orientation between two or more structures that are nearby each other within the boom package, but does not preclude intervening elements, such as spacers and the like, positioned between such structures.

In one embodiment of the invention, a pull rope is provided with a lead end attached to the head end of the material, and the pull rope has a trailing end. The tail end of the material may be attached to the trailing end of the pull rope, or the tail end of the material may be left free. The pull rope may be advantageously routed through the interior of the roll, with the length of pull rope that has not been deployed remaining coiled at a rear side of the roll, that is, opposite the front side of the roll from which the material is unspooled. When the boom is deployed, the material and the pull rope are drawn through the orifice, and the helical structure formed by the material is wrapped around the pull rope.

The length of the pull rope may be designed to be approximately the same length as the length of the helical boom structure deployed. The pull rope prevents force applied to the boom from stretching or tearing the material, deforming the helical structure of the boom or causing the boom to self-wring. Accordingly, in one embodiment of the invention, the length of the pull rope is shorter than the length of the material deployed to form the helical boom, wherein the length of material is calculated when the material is unrolled and lying flat. If two or more rolls of material are joined in series, the length of material deployed to form the helical boom is calculated by adding the lengths of each of the materials forming the longest, continuous sequence.

In another embodiment of the invention, a nozzle may be provided in the boom package, for example, wrapped within the jacket, along with at least one roll of material and optionally a pull rope. The nozzle functions as the guide, with the passageway in the nozzle defining the orifice. When the boom is deployed, the head end of the material, and, optionally, the lead end of the pull rope, are drawn together through the nozzle, which assists in forming the material into a helical structure having a desired diameter. The nozzle may be supported by a flange, with the rim of the flange positioned adjacent the front side of the roll and the nozzle aligned with the interior of the roll. The shape of the flange may be selected to correspond to the cross-sectional shape of the roll. The nozzle may be in the shape of a cylindrical tube. Alternatively, the nozzle may taper from the flange to the opening opposite the front end of the roll. The inside diameter of the nozzle may be significantly less than the outside diameter of the roll, for example, the inside diameter of the nozzle may be less than ½ of the outside diameter of the roll, less than ⅓ of the outside diameter of the roll, or even less than ¼ of the outside diameter of the roll. For non-circular rolls and nozzles, the diameter of the nozzle and the roll can be calculated as the average distance passing through the center of each.

The material may be wrapped with a binder, to maintain the integrity of the boom in a substantially cylindrical orientation, while allowing a liquid to freely contact the material forming the core of the boom. The binder may be a flexible, porous sleeve, such as a net or mesh sleeve, or one or more strings that uncoil and spiral around the helical structure created by the material, as the boom is deployed. By way of example, the binder may cover less than 10%, less than 5%, or even less than 3% of the area underneath the binder, that is, the helical structure of material. The sleeve or string may be scrunched up or coiled, respectively, and supported on the outside of the nozzle, between the nozzle and the interior of the jacket. For example, an annular space may be created between the outside of the nozzle and the opening in the jacket, and the binder may be drawn through the annular space when deployed. The jacket may provide frictional resistance to the binder, which controls its deployment.

In another example, the binder may positioned between the front side of the roll and the guide, within the boom package. For example, the binder may be comprised of two coils of strings. The head end of the material forming the roll can be attached to the lead end of each of the strings and routed through the coils, and together the material and the strings are drawn though the orifice. The coils of strings may have different orientations, so that one forms a right-handed helix and the other a left-handed helix wrapped around the helical structure formed by the material, upon deployment.

Also within the scope of the present invention is to provide multiple rolls of material within a boom package, with the material deployed from the interior of multiple rolls. The materials may be connected in parallel or series, or combination thereof. In one embodiment of the invention, two, three, four, five, or more rolls of material may be oriented in coaxial alignment within a boom package. The materials may be deployed in parallel, by connecting the head ends of each of the materials together, whereby the head end of the second roll is routed through the interior of the first roll, the head end of the third roll is routed through the interiors of the first and second rolls, etc. It can be understood that the boom formed by drawing the materials from the boom package will be comprised of each material formed into a helical structure, with the first material from the first roll on the outside of the boom structure and the last material from the last roll on the inside of the boom structure. The rolls may be turned in different directions within the boom package, so that some of the materials will form right-handed helical structures when deployed and other materials will form left-handed helical structures when deployed. A pull rope may optionally be included in the boom package, with the lead end of the pull rope passing through the interior of the rolls and attached to the head ends of the material. When the boom is deployed, the material will be wrapped around the pull rope.

The roll(s) of material, guide, binder and pull rope may be conveniently provided in a package, for example, wrapped by a jacket. The jacket may be provided with an opening at one end for drawing out the material(s), binder and pull rope. Alternatively, the jacket may be sealed to the elements, and an opening in the jacket can be readily made, for example, by tearing away a perforated section or cap. The jacket may be a flexible, shrink-wrap, which can be heated to conform to the contents, in particular, the roll(s) of material therein. Alternatively, the jacket may be rigid. Also within the scope of the invention is for the opening in the jacket to function as the orifice, that is, the orifice may be integrally formed in the jacket and represent the narrowest constriction for forming the material into a helical structure.

The elongated material may be selected from a wide range of structures, such as sheets, which may be single or multi-ply, and yarns, which may comprise single fibers or multiple fibers, such as continuous multifilament yarns and staple yarns, and yarn bundles. The particular materials and their physical structure can be selected to optimize performance in a given application, such as absorption of a liquid.

BRIEF DESCRIPTION OF THE DRAWINGS

FIG. 1 is a side view of the boom package.
FIG. 2 is a cross-sectional view of the boom package shown in FIG. 1.
FIG. 3 is a cutaway view of a boom package illustrating the use of strings as binders for the boom.
FIG. 4 is a side view of a series of booms deployed on a body of water.
FIG. 5 is a cutaway view of a boom package containing five rolls of sheet, connected to be deployed in parallel, with the sheets oriented concentrically.
FIG. 6 is a cross-sectional view of a boom package illustrating a yarn bundle as the elongated material provided on the roll and deployed to create a boom.
FIG. 7 is a side perspective view illustrating a group of boom packages stacked on a pallet.
FIG. 8 is a magnified view of the nozzle, binder and annular opening between the nozzle and jacket, from FIG. 5.
FIG. 9 is a cutaway view of a boom package showing the embodiment of the invention having the binder in the form of two coils of string deployed through the orifice.
FIG. 10 is a cutaway view of the boom package illustrating how the boom may be partially deployed, with the deployed portion clamped and cut.

DETAILED DESCRIPTION OF THE INVENTION

Without intending to limit the scope of the invention, the preferred embodiments and features are hereinafter set forth. All of United States patents and published applications cited in the specification are incorporated herein by reference. Unless otherwise indicated, conditions are 25° C., 1 atmosphere of pressure, and 50% relative humidity. The term "polymer" or "polymeric" as used in the present application denotes a material having a weight average molecular weight ($M_w$) of at least 5,000.

Referring to FIGS. 1 and 2, boom package 1 has jacket 2, which houses roll 3 of sheet 4. Sheet 4 has two ends. The start of sheet 4 is referred to as head end 5 and is drawn from the interior 6 of roll 3. The opposite end of sheet 4 is referred to as tail end 7 and is located on the exterior 8 of roll 3. Head end 5 of sheet 4 is attached to connector 9. The tail end 7 of sheet 4 may be attached to connector 10, or tail end 7 may be unattached. Pull rope 11 has lead end 12 attached to connector 9 and trailing end 13 attached to connector 10. Connectors 9 and 10 may include hardware for attaching the ends of the sheet and pull rope. In one embodiment, connectors 9 and 10 incorporate quick connect hardware, such as a spring hook, carabiner, bolt snap, trigger snap, marine hook, push gate snap, lobster claw snap hook, U-sleeve slide bolt snap, or equivalent for joining booms end-to-end. Alternatively, connectors 9 and 10 include a simple ring structure, and quick connect hardware may be used to join booms end-to-end through such rings.

Pull rope 11 extends through interior 6 of roll 3. The bulk of pull rope 11 may be conveniently coiled at rear side 14 of roll 3, and paid out through interior 6 as the boom is deployed. While it is believed to be advantageous in many instances to route the pull rope through the interior of a roll, it is also possible to pay out the pull rope along the exterior of the roll. The pull rope may be constructed of natural or synthetic materials or combinations thereof. For example, the rope may be made of multi-filaments selected from nylon, polyester and polyolefin, for example, polyethylene or polypropylene. The material for the rope may be selected to be chemically resistant to the particular environment where the boom will be deployed. The rope may be round or flat. The pull rope may also incorporate an elastic material, which contracts upon deployment of the boom to create bulkiness in the material.

The boom of the present invention is deployed by a pulling force applied to head 5 of sheet 4 and lead end 12 of pull rope 11. The force may be applied through connector 9, or by gripping sheet 4 or pull rope 11, or both, directly. The direction of the force may be substantially parallel to the axis of roll 3. The force causes sheet 4 to unspool from interior 6 of roll 3, thereby creating helical-shaped boom 15, as shown in FIGS. 3 and 4. Additionally, as sheet 4 unspools and is drawn from boom package 1, pull rope 11 uncoils. When boom 15 is deployed, sheet 4 forms an elongated helical structure having pull rope 11 positioned within the coils of the helix.

In one embodiment of the invention, the length of pull rope 11 is shorter than the length of the elongated material forming the deployed boom, such as sheet 4. For example, the length of pull rope 11 may be substantially the same length as the boom formed from the material, but because the material is wound into a helical structure, the length of the material required is greater than the length of the boom and pull rope 11. By way of further example, the length of the pull rope may be 10% or less than the length of the elongated material forming the deployed boom, or even 20% or less than the length of the material. If the pull rope incorporates an elastic component, the length of the pull rope is measured with the pull rope extended to its elastic limit, or until the non-elastic component of the pull rope prevents the elastic component from stretching to its elastic limit, whichever is less.

Several advantages arise from the boom having a center pull rope 11 that is shorter than the length of the elongated material. The pull rope prevents the boom from being stretched beyond the desired configuration, which would otherwise have the effect of opening gaps in the boom and decreasing the diameter of the boom. Furthermore, if the material forming the boom is stretched, it will have a tendency to self-wring, which could release the contaminants that one is seeking to remove from the environment. The pull rope provides greater latitude in the selection and structure of the elongated material, because the pull rope can be engineered to withstand a pulling force that might otherwise tear, break or deform the material.

Guide with Orifice

When the boom of the present invention is deployed, the material is drawn from an interior of a roll through an orifice supported by a guide. The guide may be positioned within the jacket of the boom package or the guide may be integrally incorporated in the jacket, such that the opening through which the material is drawn from the jacket also functions as the orifice, to control the shape and size of the helical structure formed by the material. In one embodiment of the invention, the guide is a nozzle supported by a flange, positioned in the boom package, between the front side of the roll of material and the opening in the jacket, with the inside diameter of the nozzle defining the orifice.

Boom package 1 may be provided with nozzle 16, to assist in the formation of boom 15 as sheet 4 is drawn from roll 3. Nozzle 16 has flange 17 adjacent front side 18 of roll 3, which supports the nozzle and positions the nozzle in alignment with the axis defined by the interior 6 of roll 3. Nozzle 16 may be in the form of a cylindrical tube having a length of 1 inch or greater, 2 inches or greater, or even 4 inches or greater. By way of example, nozzle 16 may have a length of from 1" to 9", in particular from 3" to 9". As hereinafter described in greater detail, outer surface 19 of nozzle 16 functions as a core for a binder, wherein the binder deploys along with the elongated material and wraps the boom as it is formed.

Nozzle 16 has an inside diameter selected to form a boom having a desired diameter. It can be understood that the inside diameter of nozzle 16 will vary depending upon various factors including the characteristics of the sheet, such as thickness, resilience, loft, length and stiffness, and the number of rolls provided in the boom package and deployed at the same time, i.e. in parallel, as hereinafter described. By way of example, the inside diameter of the nozzle may range from 1" to 9", in particular from 3" to 9". In addition to assisting in the formation of the boom, nozzle 16 provides sufficient frictional resistance on sheet 4, to prevent the sheet from free-spooling from roll 3 and becoming entangled, which can lead to irregularity in the helical boom structure.

Binder

Boom package 1 may contain a binder, which deploys as the elongated material, such as sheet 4, is pulled through nozzle 16. The binder wraps the outside of boom 15 to envelop and support the helical structure that is formed. Referring to FIG. 2, in one embodiment, binder 20 is a porous sleeve, such as a net or mesh, having a diameter corresponding to the target diameter of the boom. For example, the sleeve may be a knit tube, barrier net, produce packaging net, or agricultural net, such as extruded netting. The binder 20 may be scrunched up or folded, and located on outer surface 19 of nozzle 16, underneath jacket 2.

In another embodiment, the binder may be one or more coiled strings that unspool from outer surface 19 of nozzle 16, to form a helical wrapping around the elongated material, such as sheet 4. The term "string" is intended to include monofilament, multifilament and staple yarns, as well as tape, band, cord, wire, cable, and rope, which may be used to wrap the boom, without preventing liquid from reaching sheet 4, when the boom is deployed. The string may be wound in the opposite direction of the helical structure formed by sheet 4. If two coiled strings are employed, they may be wound in opposite directions to form an intersecting helical wrapping around sheet 4, i.e. right-handed and left-handed helixes. Referring to FIG. 3, string 21 and string 22 are coiled and located on the outer surface 19 of nozzle 16, underneath jacket 2, and deploy to form helical wraps around sheet 4 in two directions.

Prior to deployment, the lead end of binder 20, or the lead end of strings 21 and 20, are attached adjacent head 5 of sheet 4, for example, by a silicone rubber band, or attached to connector 9. It can be understood that as sheet 4 is pulled through the binder (sleeve or coil of string), the frictional engagement of the binder and sheet 4 provides sufficient force to draw the binder from boom package 1. The trailing end of each string may be attached to connector 10.

The trailing end of binder 20 may be provided with a band, such as a silicone rubber band, to hold the end of the binder in place on the outer surface of the nozzle. When the binder is paid out, the band slides off of nozzle 16 and wraps around the helical structure, thereby securing the tail end 7 of sheet 4. Referring to FIGS. 1 and 2, band 69 is attached to a trailing end of binder 20 in the form of a sleeve and positioned on outer surface 19 of nozzle 16. Referring to FIG. 3, the trailing ends of strings 21 and 22 are attached to bands 70 and 71, respectively. When the binder strings are fully deployed, bands 70 and 71 slide from the outer surface 19 of nozzle 16, to wrap around the helical boom structure.

An alternative structure for deploying the binder is also within the scope of the invention, wherein the binder is a porous sleeve, such as a net or mesh, which may be mounted on a hollow core supported by a flange, or one or more coiled strings, such as a pair of coiled strings, positioned between the front side of a roll of material and the guide, such that the binder and material are drawn together through the orifice. Referring to FIG. 9, boom package 72 has jacket 73 enclosing roll 74 of an elongated sheet 75. Coil 76 of string 77 and coil 78 of string 79 are positioned adjacent the front side 80 of roll 74. Coil 76 and coil 78 may be turned in opposite directions, so that one string deploys from the interior of the coil to create a right-handed helix, and the other string deploys from the interior of the other coil to create a left-handed helix. Sheet 75 of material and strings 77 and 79 are drawn through guide 81, having nozzle 82 supported by flange 83. It can be understood that nozzle 82 and opening 84 in jacket 73 may be sealed together, for example, by a press fit ring (not shown) over the jacket and nozzle. As boom 85 is deployed, it is wrapped in opposite directions by binder strings 77 and 79. The trailing end of each of binder strings 77 and 79 may be provided with a loop, such as a noose, zip-tie, cinch, which wraps around sheet 75 to prevent the strings from unraveling, when the strings are fully deployed around boom 85. Alternatively, as shown in FIG. 9, the trailing end of strings 77 and 79 may be routed between the exterior of the roll 74 and jacket 73, and attached to a connector at the rear of boom package 72, such as connector 102, show in FIGS. 1-4. Optionally, a pull rope may be provided in the boom package, as described and illustrated with regard to other embodiments of the invention disclosed herein.

Elongated Material

The elongated material may be a sheet. The term "sheet" is intended to include elongated, planar material that can be formed into a roll and deployed by pulling the end of the sheet from the interior of the roll. No particular limitation on thickness is implied. The sheet may be single ply or multi-ply, that is, two, three, four or more individual layers wound together on a roll. By way of example, the thickness of the sheet may range from 1 mil to 2 inches, in particular, from 10 mil to 0.25 inches.

The sheet or individual layers of a multi-ply sheet may be selected from woven, knitted and non-woven textiles. The textiles may be constructed of natural fibers, synthetic fibers or combinations thereof. By way of example, the textile may be constructed from fibers selected from cotton and other cellulosic materials, polyester, nylon, acrylic, polyolefin, such as polyethylene and polypropylene, and poly(vinyl chloride) ("PVC"). In one embodiment of the invention, the sheet is a textile having a thickness of 8 mil or greater, in particular, 60 mil or greater.

The sheet or individual layers of a multi-ply sheet may be a film, for example, a continuous or perforated strip of polymer ranging in thickness from 2 mil to 600 mil. The film may be a polymer selected from polyolefins, such as polyethylene and polypropylene, PVC, and polylactic acid ("PLA"). The sheet or individual layers of a multi-ply sheet may be constructed from a material intended to provide buoyancy to the boom, for example, in fresh or salt water, such as a closed cell foamed polymer, or other material having a specific gravity of less than 1, such as polyolefins, in particular polyolefins having relatively low crystallinity.

The sheet or individual layers of a multi-ply sheet may contain a scrim, for example, to provide strength, structural stability or resilience to the sheet. By way of example, the scrim may be a woven mesh with diagonal yarns, to create tri-axial reinforcement.

The elongated material may be a yarn or yarn bundle. The term "yarn" is intended to include the following configurations: (i) staple fibers twisted together, such as spun yarn; (ii) single filaments, such as monofilament fibers or narrow strips of flattened material having a width of 50 mil or less; (iii) continuous multifilament fibers laid together with or without twisting and (iv) tow bands, i.e. long, continuous, rope-like strands of manufactured filaments collected together. An individual yarn may be provided on a roll, or multiple yarns may be formed into a bundle and provided on a roll, whereby the yarn or bundle of yarns may be deployed, that is, unwound from the interior of the roll, as a single elongated material. By way of example, virtually any number of individual yarns, may be assembled on a creel and withdrawn together (aggregated) to form a bundle, as is known in the art. By way of further example, from 2 yarns to 500 yarns may be withdrawn together to create a bundle of yarns and formed into a roll.

The yarns may be constructed from natural and synthetic fibers and films and combinations thereof. In particular, the natural and synthetic materials may be selected from the materials listed above, with reference to textile sheets and films.

Referring to FIG. 6, an embodiment of the invention is illustrated having a yarn bundle as the elongated material supplied on a roll and deployed to create a boom. Boom package 49 has jacket 50 encapsulating roll 51 comprising yarn bundle 52. By way of example, yarn bundle 52 may be a group of aggregated tow bands, each formed of multiple, continuous strands of a polymer. Yarn bundle 52 is drawn from interior 53 of roll 51. Head end 54 of yarn bundle 52 is attached to connector 55, and tail end 56 of yarn bundle 52 is attached to connector 57.

Boom package 49 has pull rope 58, with lead end 59 attached to connector 55 and trailing end 60 attached to connector 57. Pull rope 58 deploys along with yarn bundle 52, such that the yarn bundle forms a helical structure wrapped around the pull rope to create a boom.

Boom package 49 is provided with nozzle 61 having flange 62 adjacent roll 51 and an open end 63 oriented away from roll 51. Nozzle 61 assists in forming yarn bundle 52 into a boom having the desired diameter and structure. Binder 64 is a sleeve, which is compressed and positioned on the outer surface 65 of nozzle 61 and attached to head 54 of yarn bundle 52 with elastic band 66. Pulling connector 55 causes binder 64 to wrap the outside of the boom, thereby enveloping and stabilizing the boom structure. When the boom is deployed and binder 64 is paid out, band 86 attached to the end of binder 64 slides off of nozzle 61 and engages the outer surface of yarn bundle 52, which is formed into a helical structure.

The function of the components of boom package 49, for example, the elongated material, pull rope, binder, connectors and jacket, are essentially the same as those described above with regard to a sheet. Nevertheless, employing an elongated material in the form of a yarn or yarn bundle may be advantageous in certain applications. For example, the yarns comprising the yarn bundle may have a relatively high surface to weight ratio, the yarn or yarn bundle may be easier to deploy, that is, require less pulling force relative to a sheet, and the yarns may be less expensive relative to woven, knitted or non-woven textiles due to fewer manufacturing steps required.

It can be understood that the precise physical structure and chemical composition of the elongated material depends on the application for the boom, such as the environment and the liquid or solid materials sought to be contained or collected. The interaction between the elongated material and the substance sought to be contained or collected may be one or more of absorption, adsorption, repulsion, neutralization, sequestration, or decomposition. For example, the material may be oleophilic or hydrophilic. The material may be treated with an acid or base, to neutralize a spilled material. The material may be treated with a surfactant, enzyme, chelating agent, oxidizing agent or reducing agent. The material may be treated with a biological agent, such as a microbe capable of degrading oil. The material may be biodegradable, so that it can be left in the environment, for example, for erosion control.

In one embodiment of the invention, an elastic component may be incorporated in the elongated material, whether the material is in the form of a sheet or a yarn or yarn bundle. The elastic component may contract after deployment, to provide bulkiness to the material. By way of example, the elastic component may be an elastomeric filament or band incorporated in a yarn bundle. With regard to sheets of material, the elastic component may be an elastomeric staple fiber or continuous filament incorporated in a sheet, or elastomeric filaments or bands bound to a sheet, for example, by conventional methods, such as the use of adhesives including hot melt adhesives, ultrasonic welding, or stitching.

Roll

The elongated material is wound into a roll using conventional techniques. If the material is wound around a hollow core or solid core, the core can be removed prior to deployment, leaving an interior passageway having a diameter, for example, of from 0.5 inches to 14 inches. By way of example, the roll may have a width of from 0.25 inches to 60 inches, and an outer diameter of from 2 inches to 72 inches.

The roll may have a circular or elliptical cross-section. In an alternative embodiment of the invention, the roll may have flattened sides for efficiently storing multiple boom packages together, such as stacking multiple layers on a pallet. For example, the roll may have a triangular, rectangular, pentagonal or hexagonal cross-section, to reduce void space when boom packages containing the rolls are stacked two, three or more layers high and two, three or more packages wide.

Multiple Rolls in a Boom Package

Multiple rolls may be provided in a single boom package, and deployed in series or parallel, or both, with the elongated material forming the roll being deployed from the interior of the roll.

The rolls may have the same width, or different widths. For example, one roll may be 3" wide and one roll may be 6" wide. Rolls having alternating widths may be utilized in the present invention. For example, four rolls may alternate from 3" to 6" to 3" to 6". The multiple rolls may be obtained from a single roll, which is slit using a knife or other known methods. The multiple rolls may have the same or different widths. For example, a single 12" roll is slit into 2-6" rolls. In another example, an 18" roll is slit into a 3", 6", 3" and 6" roll.

Referring to FIG. 5, boom package 25 has jacket 26 containing co-axial rolls 27, 28, 29, 30 and 31, formed of sheets 32, 33, 34, 35 and 36, respectively. Each of the sheets has a lead end or head, pulled from the interior of the respective roll and attached to connector 37, in parallel. Pulling connector 37 simultaneously pulls each of sheets 32, 33, 34, 35 and 36 through the interior of the rolls and nozzle 38 having flange 39, to create helical boom 40. Pull rope 41 is attached at its lead end to connector 37 and attached at its tail end to connector 42. Binder 43 is a sleeve of netting scrunched up on the outside of nozzle 38 and deploys along with sheets 32, 33, 34, 35 and 36, as with the embodiment of the invention employing a single roll. Binder 43 may be one or more coils of string, as described herein with regard to a single roll.

Each of rolls 27, 28, 29, 30 and 31 may be separated by a spacer disk, in order to reduce friction and support the shape of the boom package. Accordingly, spacers 44, 45, 46 and 47 are interposed between rolls 27 and 28, 28 and 29, 29 and 30 and 30 and 31, respectively. The shape of the spacers corresponds to the cross-section of the rolls. For example, if the rolls have a rectangular cross-section, then the spacers will be rectangular.

The deployment of two or more rolls in parallel to form a boom creates several advantages. When sheets are deployed from multiple rolls in parallel, with the rolls aligned along the same axis, the helical structures created by the sheets will be concentric, that is, one sheet will be wrapped by another sheet. Thus, the multiple sheets within the boom provide a synergistic effect, because they are able to reinforce, compliment and support each other.

It is believed that paying out the sheet from the interior of the roll is particularly advantageous when multiple, co-axial rolls are employed. With reference to the rolls from front to back, each successive sheet of material is drawn through the interior of the preceding roll and is wrapped by the sheet from such preceding roll. For example, the sheet from the second roll is drawn through the interior of the first roll and is wrapped by the first sheet. Accordingly, friction between the second sheet and the first roll is minimized. It can be understood that if one provided multiple, co-axial rolls and paid out the sheets from the outside of the rolls, rather than the interiors, one could expect significantly greater friction, as the rearward sheet would be drawn across the exterior of the preceding roll and would have a tendency to constrict and interfere with the sheet paying out from the preceding roll.

In one embodiment of the invention, at least two rolls are wound in opposite directions. When the sheets on the rolls are deployed, they create helical structures winding in different directions, that is, one is a right-handed helix and the other is a left-handed helix. Accordingly, one helix reinforces and supports the other. When three or more rolls are deployed, at least one of the rolls can be positioned to create a right-handed helix and at least one other roll can be positioned to create a left-handed helix when deployed. The scenario can be repeated when more than three rolls are used. For example, the winding direction of each roll can alternate in a boom package. Referring to FIG. 5, sheets 32, 34 and 36 can produce a right-handed helix and sheets 33 and 35 can produce a left-handed helix.

Referring to FIG. 8, a magnified view of the front end of boom package 25 is provided. Band 87 is attached to the trailing end of binder 43 and positioned over nozzle 38. Band 87 slides off and wraps around boom 40 when binder 43 is fully deployed. Binder 43 is drawn through annular space 88 between jacket 26 and nozzle 38. The distance between jacket 26 and the outside diameter of nozzle 38 at annular space 88 may be sized to provide sufficient frictional resistance against binder 43, to achieve uniform deployment of the binder. The jacket forming the outer boundary of annular space 88 may be reinforced, for example, with a relatively stiffer material in the shape of a ring, to provide strength and uniformity.

Another advantage of using multiple rolls in a single boom package is manufacturing efficiency. Custom booms can be provided by mixing and matching two or more rolls, to provide the functionality associated with each of the sheets. For example, two highly absorbent, oleophilic sheets may be combined with a third sheet providing relatively greater buoyancy than either of the other sheets. In another example, a first roll containing a highly absorbent nonwoven first sheet may be combined with a second roll containing a sheet having relatively greater resilience or strength. Also within the scope of the invention is to provide a roll of material having relatively greater resilience than at least one other roll in the boom package. In one example, multiple sheets may be deployed in parallel, with the sheet having relatively greater resilience placed in the rear, so that when the sheets are deployed simultaneously, the more resilient sheet will be in the interior of the helix and provide support for the other sheet or sheets. As used herein the term "resilient" or "resilience" is a measurement of the tendency of a sheet, band, wire or other elongated structure to return to its flat or straight-line orientation.

The resilient material may be in the form of a wire, monofilament or multifilament yarn, or a narrow band of metal or polymeric material, which is deployed along with the sheets. It can be understood, that for deployment of the boom on water, it will generally be preferable to incorporate a resilient material constructed of a material that is buoyant or has a density less than 2 $g/cm^3$, in particular less than 1.5 $g/cm^3$. For deployments on land, such as a beach to contain an oil spill or to provide erosion control, a steel wire or band may be preferable.

In another embodiment of the invention, at least three co-axial rolls of sheet are provided in the same boom package, wherein at least two of the rolls are deployed in parallel and at least two of the rolls are deployed in series. For example, depending upon the thickness of a sheet or the resilience of a sheet, it may be advantageous to provide a particular material on two rolls, rather than one. The two rolls could be linked in series, that is, the tail of the sheet in the forward roll could be attached to the head of the sheet from the rearward roll. In one embodiment of the invention, the two rolls having sheets linked in series are positioned as the rear of an assembly of at least three rolls in a boom package, to avoid deploying a sheet through a roll that is not being paid out initially.

While the foregoing description references the embodiment of the invention wherein the elongated material is a sheet, the description applies to embodiments wherein the material is a yarn or yarn bundle, as well. Furthermore, it can be understood that the multiple rolls in a boom package may comprise any combination of elongated materials, that is, a mixture of rolls of sheet and rolls of yarn or yarn bundles.

Boom

The length and diameter of a particular boom made according to the present invention is dependent on various factors, including the length of the elongated material(s), whether multiple rolls and materials are provided, and whether the materials are deployed in parallel or in series. In embodiments of the invention in which the elongated material(s) are drawn from the boom package through a nozzle or other orifice, the size and shape of the orifice can influence the diameter of the boom. By way of example, the booms may range in length from 3 feet to 1,000 feet, with a diameter of from 1 inch to 24 inches, in particular from 3 inches to 12 inches, more particularly from 3 inches to 8 inches.

It can be understood that the entire roll of sheet need not be deployed at one time. For example, a relatively minor spill in a chemical manufacturing plant may require only 50 feet of boom. Accordingly, the desired length of boom can be deployed from the boom package and the boom can be clamped at the trailing end, i.e. the portion of sheet emerging from the nozzle of the boom package. The sheet can be cut at the clamping site and a new lead connector attached to the remaining sheet and pull rope. Referring to FIG. 10, boom package 89 has jacket 90 enclosing rolls of material 91, 92 and 93. Nozzle 94 is supported by flange 95. Binder 96 is positioned on nozzle 94. Band 97 is attached to the trailing end of binder 96 and mounted on nozzle 94. Boom 98 may be cut at location 99, after attaching clamps 100 and 101 at either side of the cut location. It can be understood that in place of using clamps 100 and 101, other methods may be employed, such as wrapping the cut ends with a scrim reinforced tape, such as duct tape.

Referring to FIG. 4, the fully deployed boom 15 is shown floating on a body of water. Jacket 2 may be left with boom 15 and can act as a barrier, or the jacket may be slit and removed. Connector 10 of boom 15 is attached to connector 23 of boom 24. It can be understood that any number of booms can be joined together in series, parallel, or both. Multiple booms can be connected to form a two-dimensional lattice or other configuration, as desired for a particular application.

Boom Package and Storage

The deployment of the elongated material from the interior of the rolls presents unique opportunities for packaging. There is no need to provide a core to support the roll, and, therefore no need to provide a rigid support for the core. There is no requirement that there be a margin of space around the exterior of the roll, as is typically needed if the material is pulled from the outside of the roll. In fact, multiple boom packages may be stacked on top of each other, with the weight of one package pressing down on the exterior of the package below. The deployment of the material from the center of the roll and the uncoiling of the pull rope is not affected.

Whether a single roll or multiple rolls are provided in a boom package, the package may be provided with a flexible jacket, such as a shrink wrap, polymer film, which is fitted over the contents, such as rolls, pull rope, binder sleeve or string, nozzle, spacers, etc. The shrink wrap may be a polyolefin, such a polyethylene or polypropylene, or poly (vinyl chloride). The jacket can then be sealed and heated, to shrink wrap the contents.

Referring to FIG. 1, when the boom is to be deployed, one need only tear off the nose 48 of jacket 2 and begin pulling connector 9, to which the head 5 of sheet 4, lead end 12 of pull rope 10 and binder is attached. With the jacket providing an air-tight seal for the boom package contents, the boom package may be stored for 5 years or more, prior to use, without the functionality being impaired.

FIG. 7 illustrates how the boom packages of the present invention may be efficiently stored and deployed. Boom packages 67 are provided with a substantially square cross-section and arranged on pallet 68 in three layers. For example, one may be able to fit three boom packages per layer, with each package capable of deploying 100 feet of a 6 inch diameter boom, for a total length of 900 feet. It can be understood that a boom can be deployed from a package stored on a pallet.

Example

The following example illustrates the manufacture of a boom package of the present invention, having multiple rolls of absorbent sheets, which can be deployed in parallel to form a containment boom.

A 24" wide, multi-ply roll of absorbent sheets is formed as follows. Multiple rolls of absorbent sheets, each having a width of 24" are positioned on a textile creel. Five sheets are simultaneously wound on a 4" diameter mandrel to reach an outside diameter ("OD") of 16". The mandrel is removed and the 24" wide roll is cut crosswise to create four 5-ply rolls, each having a width of 6". The 5-ply sheet has a thickness of approximately 0.11".

Circular dividers are provided to separate the individual rolls in the boom package and to maintain the shape and stability of the boom package. The dividers are cut from corrugated cardboard sheets, with each of the dividers having an OD of 16". A 5" circular opening is made in the center of each of the dividers.

The nozzle may be made from a cardboard tube having a diameter of 5" and a length of 6". The nozzle is supported by a flange, joined to the outer surface of the nozzle. The flange is a circular sheet of corrugated cardboard having a 16" diameter. A "star" hole having a diameter of 5", corresponding to the outside diameter of the nozzle, is cut in the center of the flange. The nozzle is inserted into the center opening of the flange, which bends the legs of the star parallel to the nozzle and perpendicular to the flange. With one end of the nozzle flush with the flange, the star legs are taped to the outside of the nozzle.

Netting is placed on the outside of the nozzle. The netting is in the shape of an elongated sleeve, having a diameter of approximately 9", which can be folded and compressed, so that the netting tapers from the flange to the discharge end of the nozzle.

The pull rope is formed by a high tenacity strap, which is wound into a 15" OD coil and fastened to one side of the rearmost divider. A carabiner is attached to one end of the pull rope and a large pull ring is attached to the other end of the pull rope.

The boom package may be assembled as follows. The four rolls of absorbent media are placed on a work bench, with the rolls alternated to create alternating right-handed and left-handed helixes, when deployed. The dividers are placed between the rolls and at the back end of the assembly. The nozzle and flange combination, with the netting mounted thereon, is placed at the front end of the roll assembly. The pull ring attached to the interior end of the pull rope coil is threaded through each of the rolls of absorbent material and through the nozzle, such that the pull ring is positioned adjacent the discharge end of the nozzle. The interior end of each of the rolls and the end of the netting is attached to the pull ring with a wire tie.

A polyethylene jacket is wrapped around the assembly and welded closed, with only the carabiner attached to the outside end of the pull rope extending from the jacket. Heat is applied to the jacket to shrink it around the outside of the rolls, dividers, nozzle and flange. A perforating tool is used to perforate the jacket around the discharge end of the nozzle, creating a tear-away cover over the discharge end of the nozzle.

The containment boom is deployed by first tearing the jacket along the perforated strip at the discharge end of the nozzle. The pull ring will be visible inside the nozzle. When the pull ring is drawn away from the package, the rolls of absorbent sheets, along with the pull rope, will be drawn through the center of the dividers and the nozzle. As the material exits the nozzle, the netting is drawn out and surrounds the helical structure formed by the material.

Applications

The present invention has numerous applications on both water and land. The boom may be used on bodies of fresh water and salt water. The boom may be tailored to float on the water, for example, to be partially submerged with a portion of the boom above the surface and a portion of the boom below the surface. On land, the boom may be deployed on soil, paved areas, and around and inside buildings.

The boom can used to contain and collect spilled oil or other liquid hydrocarbon. The boom can be used to contain and collect spilled industrial chemicals. The boom can be deployed on sloped land for erosion control. The boom may be used around drains as a wattle.

The boom may be reusable. For example, if the boom is oleophilic and has collected a significant volume of oil, it may be passed through a wringer to extract the oil and redeployed at the site of the spill.

There are, of course, many alternative embodiments and modifications of the invention, which are intended to be included within the following claims.

What we claim is:

1. A method of deploying a containment boom, comprising the steps of:
    (a) providing a roll of an elongated material in a package, wherein the material has a head end located at an interior of the roll and a tail end located at an exterior of the roll, the roll having a front side and a rear side;
    (b) providing a pull rope in the package, adjacent the rear side of the roll, the pull rope having a first end extending through the interior of the roll and attached to the head end of the material and the pull rope having a second end opposite the first end;
    (c) providing a guide in the package having an orifice aligned perpendicular to an axis of the roll, adjacent the front side of the roll; and
    (d) drawing the head end of the material and first end of the pull rope from the interior of the roll, through the orifice and out of the package to deploy the containment boom, whereby the material deploys to form a helical structure, which is wound around the pull rope.

2. The method of claim 1, wherein the pull rope has a length that is shorter than a length of the material deployed to form the helical structure.

3. The method of claim 1, wherein the guide comprises a nozzle supported by a flange, and the orifice is defined by the nozzle, the nozzle having an inside diameter that is less than an outside diameter of the roll, and the material and pull rope are drawn through the nozzle.

4. The method of claim 3, further comprising the step of providing a binder positioned on an outside of the nozzle, the binder having an end attached to the head end of the material, whereby drawing the material and pull rope through the nozzle draws the binder, whereby the binder wraps the helical structure formed by the material.

5. The method of claim 4, wherein the nozzle has a length of from 3" to 9".

6. The method of claim 4, wherein the binder is selected from the group consisting of a flexible sleeve and string.

7. The method of claim 6, wherein the binder is a sleeve in the form of a net.

8. The method of claim 1, wherein the package is a flexible jacket that is shrink-wrapped around the roll of elongated material, pull rope and guide, and the jacket has an opening for deploying the material that is separate from the orifice.

9. The method of claim 1, further comprising the step of providing a binder positioned within the package between the front side of the roll and an opening in the package, wherein the binder is selected from the group consisting of a flexible sleeve and string, whereby drawing the material and pull rope through the opening in the package draws the binder, causing the binder to wrap the helical structure formed by the material.

10. The method of claim 1, wherein the orifice has a diameter of from 1" to 9".

11. The method of claim 1, wherein the elongated material comprises a sheet selected from the group consisting of woven, knitted and non-woven textiles and polymer films.

12. The method of claim 1, wherein the elongated material comprises a yarn selected from the group consisting of natural and synthetic fibers and polymer films having a width of 50 mils or less.

13. A deployable containment boom, comprising:
   (a) an elongated material in the form of a roll, the material having a head end located at an interior of the roll and a tail end located at an exterior of the roll, the roll having a front side and a rear side;
   (b) a pull rope, adjacent the rear side of the roll, the pull rope having a first end extending through the interior of the roll and attached to the head end of the material and the pull rope having a second end;
   (c) a guide having an orifice aligned perpendicular to an axis of the roll, adjacent the front side of the roll, whereby the head end of the roll and the first end of the pull rope may be drawn through the orifice to create a helical structure; and
   (d) a jacket containing the roll, pull rope and guide, from which the head end of the material and pull rope can be drawn, to deploy the containment boom.

14. The deployable containment boom of claim 13, wherein the pull rope has a length that is shorter than a length of the material deployed to form the helical structure.

15. The deployable containment boom of claim 13, wherein the jacket is a flexible shrink wrap, which has been shrunk to fit against an exterior of the roll.

16. The deployable containment boom of claim 13, wherein the guide comprises a nozzle supported by a flange, and the orifice is defined by the nozzle, the nozzle having an inside diameter that is less than an outside diameter of the roll.

17. The deployable containment boom of claim 16, further comprising a binder positioned on an outside of the nozzle, the binder having an end attached to the head end of the material, whereby drawing the material and pull rope through the nozzle draws the binder, whereby the binder wraps around the helical structure formed by the material.

18. The deployable containment boom of claim 17, wherein the binder is selected from the group consisting of a flexible sleeve and string.

19. The deployable containment boom of claim 17, wherein the binder is a sleeve in the form of a net.

20. The deployable containment boom of claim 17, wherein an annular space is formed between the jacket and an outside diameter of the nozzle, and the binder can be drawn through the annular space when the material and pull rope are drawn through the nozzle.

21. The deployable containment boom of claim 13, further comprising a binder positioned within the jacket between the front side of the roll and the guide, wherein the binder is selected from the group consisting of a flexible sleeve and string, and wherein an end of the binder is attached to the head end of the material, whereby the binder wraps the helical structure formed by the material, when the material is drawn from the package.

22. The deployable containment boom of claim 13, wherein the orifice has a diameter of from 1" to 9".

23. The deployable containment boom of claim 13, wherein the elongated material comprises a sheet selected from the group consisting of woven, knitted and non-woven textiles and polymer films.

24. The deployable containment boom of claim 13, wherein the elongated material comprises a yarn selected from the group consisting of natural and synthetic fibers and polymer films having a width of 50 mils or less.

25. A deployable containment boom, comprising:
   (a) a first elongated material in a first roll, wherein the first material has a head end located at an interior of the first roll and attached to a lead connector and a tail end located at an exterior of the first roll, the first roll having a front side and a rear side;
   (b) a second elongated material in a second roll, in coaxial alignment with the first roll, positioned adjacent a rear side of the first roll, wherein the second material has a head end extending from an interior of the second roll and through the interior of the first roll and attached to the lead connector and a tail end located at an exterior of the second roll, the second roll having a front side and a rear side;
   (c) a guide having an orifice aligned perpendicular to an axes of the first roll and the second roll, whereby the head ends of the first roll and the second roll may be drawn through the orifice with the first material forming a first helical structure and the second material forming a second helical structure within the first helical structure; and
   (d) a jacket containing the first roll, second roll and guide, from which the head end of the first and second materials can be drawn, to deploy the containment boom.

26. A deployable containment boom, comprising:
   (a) an elongated material in the form of a roll, the material having a head end located at an interior of the roll and a tail end located at an exterior of the roll, the roll having a front side and a rear side;
   (b) a nozzle supported by a flange, adjacent the front side of the roll, whereby the nozzle defines an orifice aligned perpendicular to an axis of the roll, whereby the head end of the material may be drawn through the orifice to create a helical structure;
   (c) a binder positioned on an outside of the nozzle, the binder having a lead end attached to the head end of the material and a trailing end, whereby drawing the head end of the material through the orifice causes the binder to wrap the helical structure formed by the material; and (d) a jacket containing the roll, nozzle, flange and binder, from which the head end of the material and binder can be drawn, to deploy the containment boom, wherein the binder wraps the helical structure.

* * * * *